United States Patent
Srikumar

(12)
(10) Patent No.: US 6,868,547 B1
(45) Date of Patent: Mar. 15, 2005

(54) CONSUMER REPLACEABLE DATA PLAYER DOOR

(75) Inventor: Achuthan Srikumar, Singapore (SG)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/700,141

(22) PCT Filed: May 12, 1999

(86) PCT No.: PCT/EP99/03283

§ 371 (c)(1),
(2), (4) Date: Nov. 9, 2000

(87) PCT Pub. No.: WO99/59152

PCT Pub. Date: Nov. 18, 1999

(30) Foreign Application Priority Data

May 14, 1998 (EP) .............................. 98401162

(51) Int. Cl.[7] ............................................. G11B 17/03
(52) U.S. Cl. ..................................................... 720/655
(58) Field of Search ........................ 720/655; 206/722, 206/723, 724; 369/752

(56) References Cited

U.S. PATENT DOCUMENTS

| | | | |
|---|---|---|---|
| 4,661,865 A | 4/1987 | Ida et al. ................... | 360/96.6 |
| 5,484,063 A | 1/1996 | Cuccio et al. .............. | 206/722 |
| 5,583,834 A | * 12/1996 | Kanada et al. ............. | 369/13.2 |

FOREIGN PATENT DOCUMENTS

| | | | |
|---|---|---|---|
| EP | 0163549 | 12/1985 | .......... G11B/33/02 |
| JP | 5-94690 | 4/1993 | .......... G11B/33/02 |
| JP | 8-102178 | 4/1996 | .......... G11B/33/02 |
| JP | 9-233382 | 9/1997 | .......... H04N/5/225 |

OTHER PUBLICATIONS

Patent Abstracts of Japan, vol. 096, No. 008, Aug. 30, 1996 & JP 8–102178.
Patent Abstracts of Japan, vol. 098, No. 001, Jan. 30, 1998 & JP 9–233382.

* cited by examiner

*Primary Examiner*—David Davis
(74) *Attorney, Agent, or Firm*—Joseph S. Tripoli; Robert D. Shedd; Paul P. Kiel

(57) ABSTRACT

A portable data player and or recorder having a door which can be easily assembled or disassembled from a casing of the disk player. The door is fitted with brackets which, in a wide open angular position of the door, can slide in a first direction along hinges of the casing up to an abutting position. In an open position a rib of the door is an abutment against a shoulder of the casing, thus preventing any disassembling of the door from the casing. Disassembling from the casing is made possible if the door is wide open. Then the shoulder does not prevent the sliding of the brackets of the door in a second direction, opposite the first one, along hinges of the casing. The invention makes it easy to change the door without any tooling, so that a user may choose the colour of the door according to their taste.

6 Claims, 3 Drawing Sheets

CONSUMER REPLACEABLE DATA PLAYER DOOR

This application claims the benefit under 35 U.S.C. §365 of International Application PCT/EP99/03283, filed May 12, 1999, which was published in English under PCT Article 21(2) on Nov. 18, 1999, and which claims the benefit of European Application EP 98401162.7 filed May 14, 1998.

The invention is in the field of portable data player and or recorder, and more particularly in the field of compact disk player.

A portable data player such as magnetic recorder or compact disk player comprises a casing having an opening. Said opening of the casing may be closed or open according to the position of a door which is rotatably attached to said casing, for instance by means of hinges and backets. The axis of rotation of the door relatively to the casing is thereafter referred to as axis AA'. Usually the door is assembled to the casing in a factory and cannot be disassembled easily by the user of such portable data player or compact disk player.

The compact disk door is one of the most important external part of the portable compact disk player since it has a large surface and gives the compact disk player a great part of its look, distinguishing it from others.

Furthermore the compact disk player is supported to protect the portable device from external influence and therefore gets all the external impacts which may, for instance, cause scratches on it and make the player looked wearied out.

The purpose of the invention is a portable disk player with a door that can be easily assembled or disassembled from the casing by the user without the need for any tooling. Although the invention will thereafter be described for a disk player, the principles shown in the following description could apply to any other data player.

With such an easy assembled door, the user may choose a colour of door on shelves, that fits best his taste. Also several doors can be sale with every portable player, so that the user has a choice to assemble one of the doors he likes best one day or another door the other day.

According to the invention, the door, when attached to the casing, is able of at least two ranges of angular open positions, and of a third position in which the door is closed, closing the opening of the casing.

In a first range of angular positions referred to as widely open, the door is rotatively attached to the casing. For instance the hinges of the casing are set into the brackets of the doors. In this first range of angular position the backet can slide along the hinges in a first axial direction up to a first axial position in which a first shoulder of the door is in abutment against a first shoulder of the casing.

On the reverse, when the door, still in a widely open position, is slid along axis AA', in the second direction of said axis, the door will reach a second axial position in which said door is detached from the casing.

When the door is abutting against the first shoulder, then it can be rotated up to a second range of angular positions referred to as open. In said second range of open positions a rib or more generally a second shoulder of the door is in abutment against a second shoulder of the casing. In said second range of open positions, the brackets or any other part of the door are abutting, for instance, on their right side to a first shoulder or set of shoulders of the casing while a left surface of a rib, that springs sensibly perpendicularly to the axis of rotation of the door, from the main surface of the door is abutting on a second shoulder of the casing.

In this second range of positions, the door cannot slide anymore, because its movement along the axis AA' of rotation, toward the left, is blocked because of the first shoulder, while the movement of rotation toward the right is blocked by the second shoulder of the casing.

Said abutments on the right and left side are exerting their locking function of sliding, while the door is in the second range of positions and also when the door is in a third position known as a closed position in which the door closes the opening of the casing.

To sum up the invention is about portable data player and/or recorder having a casing and a door, said door being rotatably attached about an axis AA' to said casing, said axis AA' defining a first and a second directions, the door and the casing being able relatively to each other of at least two ranges of angular positions, a first range of positions in which the door is widely open, a second range of position in which the door is open and of a closed position, said last position being a position in which the door closes an opening of said casing, wherein, in the first range of angular positions, the door can slide along axis AA' in the first direction up to a first axial position in which a first shoulder of the door is abutting against a first shoulder of the casing, and wherein, in the first range of angular positions, said door can slide along axis AA' in the second axial direction up to a second axial position in which the door and the casing are disengaged from one another, and wherein, in the second range of angular position and the first axial position, a second shoulder of the door is abutting against a second shoulder of the casing preventing any translation movement of the door along axis AA' in the second direction.

The invention also proposes a portable data player and/or recorder having a casing and a door, the door being rotatably attached about an axis AA' to said casing, the door and the casing being able relatively to each other of at least two ranges of angular positions in which the door is open and of a closed position, said closed position being a position in which the door closes an opening of said casing, wherein the door and casing are fitted one with a shoulder and the other with a rib, the rib being in abutment against the shoulder in one of the range of angular positions.

There is also disclosed a door of a portable data player and/or recorder, said door having a main face and three ribs, two first and a third, perpendicular to the main face, the fist two ribs having holes, having an axis AA', and suitable to form brackets of the door, and the third having a form such that it is not secant to planes containing axis AA' and sensibly perpendicular to the main face of the door and secant to planes containing axis AA' and forming an angle with the plane of the main face of the door, which are less than about 90°.

A preferred embodiment of the invention will now be described in accordance with the attached drawings in which FIG. 1 is a perspective view of a casing embodying the invention.

First it is to be noted that the invention is about the attachment of the door to the casing of a compact disc player. It is the reason why, in FIGS. 1, 2 and 3, only those features which are of interest for the invention have reference numbers and will thereafter be described.

Figure 1:
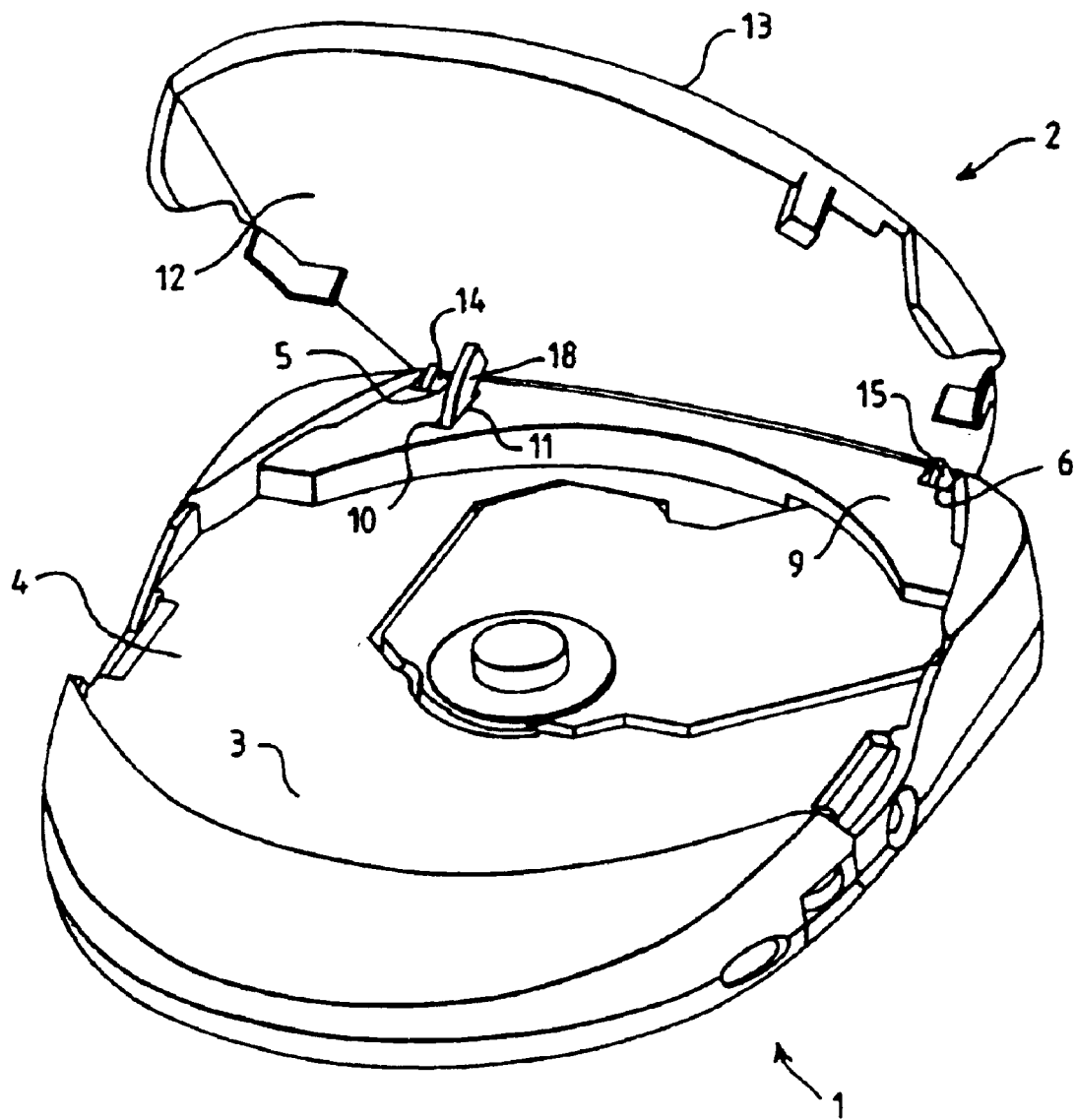

FIG. 1 is a perspective view of a casing 1 and door 2.

Figure 2:
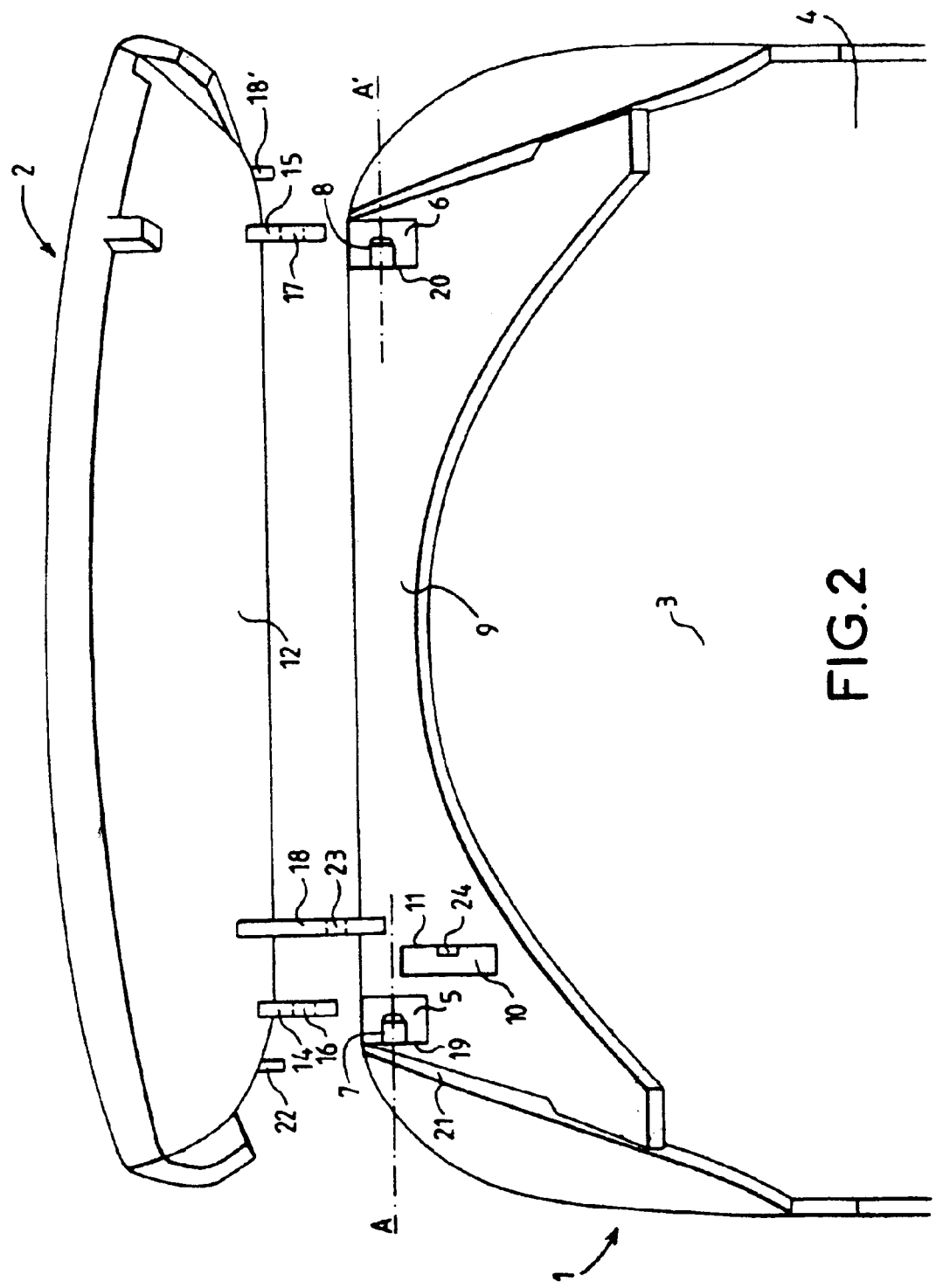
FIG. 2 is a perspective view of the rear of a casing and a door embodying the invention.
Figure 3:
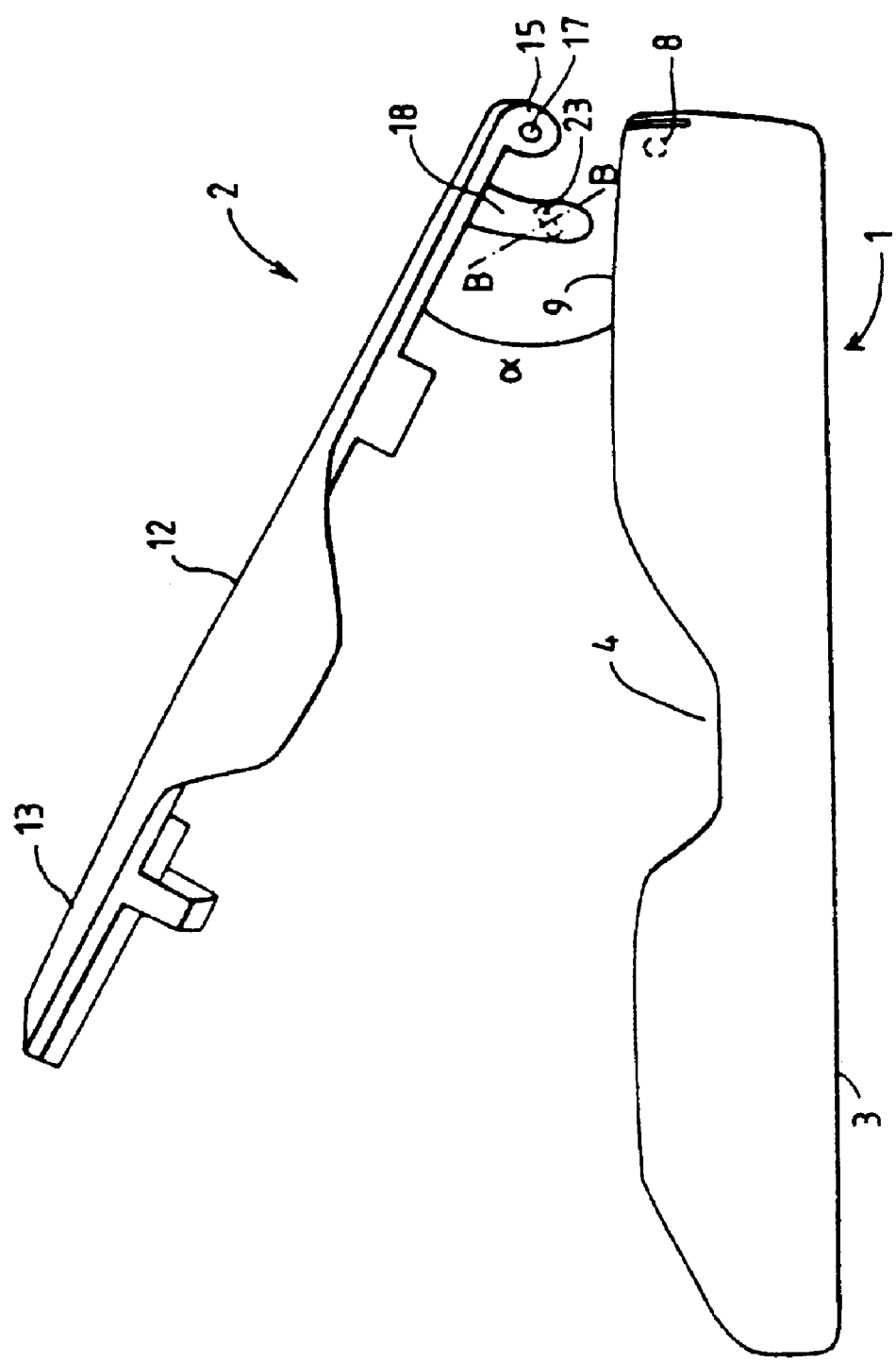
FIG. 3 is side view of the door and casing represented in FIG. 2.

FIG. 2 is a front perspective view of the rear part of a casing i and a door 2 according to the invention. FIG. 3 is a side view of the same casing 1 and door 2. FIGS. 2 and 3 are focused mainly to the attachment of door 2 to casing 1 and to the means to make such an attachment, but the forms which are represented in FIGS. 2 and 3, are near from the usual form of compact disk player so that the man skill in the art can more readily identify the different piece parts. In FIGS. 1, 2 and 3 the element having the same functions are referred to by the same reference number.

The casing 1 represented in FIG. 1, has a main base face 3, which is generally parallel to the plan of a compact disk, when said disk, not represented, is in the casing in a position to be read. The top of said casing has an opening 4. The rear part of the casing has two recesses 5 and 6. Those recesses are in form of hole from a top surface 9 of the casing and also from the rear lateral surface of the casing 1. From a face 19, 20 of each of said recesses 5, 6 springs a shaft 7, 8 respectively. The top face 9 of the casing 1 is also fitted with a hole 10 surrounded by faces, and among those faces an abutting face 11. The top face 9 of the casing 1 is a face which is parallel to main base face 3 and at a distance from said base face. Said face may be present only at the rear of the casing as represented on FIGS. 1 and 2 and can be a stepped face, having different levels.

The door is represented on FIGS. 1, and 2 in the general form of a plate 12 with a rounded end 23. For what concerns the mounting of the door 2 on the casing 1, the door is fitted with three ribs 14, 15, 18 springing sensibly perpendicularly to the plan of the main plate 12. Two of those ribs, 14 and 15 are fitted with holes 16, 17 respectively.

The functioning of said casing will now be explained. First it is to be stated that when it is spoken of an angular position of the door relatively to the casing, it is spoken of the angle α of a dihedral formed between the base plan 3 of the casing and the plan of the main plate 12 forming the door 2. In the form represented in FIGS. 1, 2 and 3, those planes are easily identified. However in a usual disk player those planes may not be physically present, because for instance, the door and or the casing, may have for a esthetic or other reasons spherical forms which are almost planes but not quite plane. In said cases, which are most common, the plane corresponding to the base plane 3 of the casing and the plane corresponding to the base plane 3 of the casing and the plane corresponding to the main pite 12 of the door 2 are fictitious planes. However, it can be said that when the door is in the closed position the angle a of the dihedral between those fictitious planes is 0, and that said angle increase along with the opening of the door.

In FIGS. 2 and 3 the door 2 has been represented in one of the open position of the door, the door 2 being detached from the casing 1. The mounting of the door is as follows. First the door 2 is brought near the casing 1 in a wide open angular position the ribs 14 and 15 being in the recesses 5 and 6. Then the door 2 is translated towards the left side, parallels to axis AA'. By this movement the shafts 7 and 8 enter in the holes 16 and 17 of the ribs 14 and 15 respectively. The door 2 will slide along axis AA' until the left hand side of ribs 14 and 15 or at least one of them abuts against one of the faces 19, 20 of the recess 5, 6. In this position it may be understood that the shafts 7 and 8 have the function of hinges while the holes 16 and 17 of the ribs 14 and 15 have the function of backets. When the door is further rotated towards a closed position it will reach a position in which third rib 18 will enter hle 10 of the casing, the right face of rib 18 abutting on a face 11 of said hole 10. Said position when said third rib 18 starts to enter hole 10, or said an other way, when the right face of third rib 18 begins to abut against a face 11 of the casing 1, is the intermediate position between has been called the range of wide open positions and the range of open positions.

It is to be noted that the present invention which has been here above described in relation with FIGS. 1, 2 and 3 represents a particular embodiment so that the invention is well understood. The invention is not to be limited to this single embodiment given as an example some alternative embodiments carrying the invention will thereafter be described.

First it is to be understood that it is equivalent for the invention that the brackets are on the door and the hinges on the casing as represented on the figures, or that some or all brackets are on the casing and some or all hinges on the door. There could be more than two brackets and hinges, for instance three or more. There also could be only one brackets and hinge, if it is long enough for preventing looseness.

Second it is to be understood that the first abutting faces of the casing 1 which have been represented as being faces 19 and 20 of the recesses 5 and 6 could be any shoulder as represented as 21 of the casing, said shoulder being made as represented in 21, by a vertical step of the surface 9, or by a local extension of one of the walls of the casing 1. Said step or extension 21 is a shoulder which extends perpendicularly to axis AA'. In the case where the first abutment shoulder of the casing would be the step or extension 21 of a wall of the casing 1, the corresponding abutting part of the door would be a part 22 of the lateral surface of the door 2, said lateral part 22 of the surface being perpendicular to axis AA'. It is also to be noted that there could be no need of a shoulder specially devoted to maintain the door 2 on its left hand side, which is here the first axial direction if for instance the holes 16 and 17 of the ribs 14 and 15 were blind holes, having a bottom, said bottom abutting on an end of shafts 7 or 8. In said case the first abutting face would be said ends or one of said ends.

Third it is also to be understood that the third rib 18, and face 11 of the hole 10 of the casing 1 could be replaced by a rib 18' placed at a side of the door 2, said rib then abutting on a wall of the casing 1, when the door reaches the beginning of the range of the open positions. It is the reason why it is generally spoken of a second shoulder of the door abutting on a second shoulder of the casing. In fact what is important for rib 18, is that it has a form such that it is not secant to a planes containing axis AA' and forming an angle with the main face (12) of the door (2) which is superior to an angle which is a limit between a wide open position of the door and an open position of the door, and secant to planes containing axis AA' and forming an angle with the plane of the main face (12) of the door (2) which is inferior to said angle which is a limit between a wide open position of the door and an open position of the door. Said limit angle could have for instance a value around 90°.

An interesting feature of the invention will now be described in relation with FIGS. 2 and 3 only. This feature is devoted to maintain the door in one at least of the positions of the open position range. Said feature is to facilitate the introduction or exchange of a compact disk.

It has been explained that rib 18 is in the second range of open positions in abutment against a shoulder 11 of the casing 1. In the preferred embodiment said rib 18 is fitted with a hle 23. The shoulder 11 is fitted with a tongue 24 extending outwardly from the surface of said shoulder 11. The functioning is as follows. When opening the door from the closed position, the tongue 24 slides against the surface of the rib 18, up to the point where said tongue will enter into hole 23. The entering movement takes place because of a slight elasticity of the rib 18 and of slight deformation of the door which is made in a deformable material such as plastic for instance a polycarbonate. To ease the movement of penetration and retraction the edges of hole 23 are chamfered edges. Also it is easier if the edges of the tongue 24 are chamfered. There is only one such hole 23, but if several maintained open positions were needed it is possible of coarse to have several hole 23 on rib 18. Said feature has been explained in relation with the easy fitting door 2, but it cold as well be done with a fixed door. It is to be noted that for this feature it is equivalent that the tongue 24 is on the door and the hole on the casing. The hole can be a through hole as represented FIGS. 2 and 3 or a blind hole or a recess or a lock notch.

In this aspect the invention is for a portable data player and or recorder having a casing and a door, said casing and door being fitte with hinges and brackets so that the door is rotatably attached about an axis AA' to said casing, the door and the casing being able relatively to each other of a range of angular positions in which the door is open and of a closed position, said last position being a position in which the door closes an opening of said casing, data player and or recorder wherein the door and casing are fitted one with a tongue and the other with a recess in a shoulder whose dimensions are such that the tongue can enter the recess, the tongue being in abutment against the shoulder in at least a part of the range of open positions said tongue being in a position in which it penetrates in the recess in one of the open positions.

What is claimed is:

1. A portable data player and/or recorder comprising a casing and a door, said door being rotatably attached about an axis AA' to said casing, said axis AA' defining a first and a second directions, the door and the casing being able relatively to each other of at least two ranges of angular positions, a first range of positions in which the door is widely open, a second range of position in which the door is open and of a closed position, said last position being a position in which the door closes an opening of said casing, wherein, in the first range of angular positions, the door can slide along axis AA' in the first direction up to a first axial position in which a first shoulder of the door is abutting against a first shoulder of the casing, and wherein, in the first range of angular positions, said door can slide along axis AA' in the second axial direction up to a second axial position in which the door and the casing are disengaged from one another, and wherein, in the second range of angular position and the first axial position, a second shoulder of the door is abutting against a second shoulder of the casing preventing any translation movement of the door along axis AA' in the second direction.

2. Portable data player and/or recorder according to claim 1 wherein said casing and door are fitted with hinges and brackets for the attachment of the door to the casing and wherein the hinges are in the form of shaft springing from a face of first recesses of the casing said faces being the first shoulder, and wherein the brackets are in the form of holes of first ribs that spring outwardly from a main face of the door.

3. Portable data player and/or recorder according to claim 1, wherein the second shoulder of the door is in the form of a second rib that springs from a main face of said door and wherein the second shoulder of the casing is in the form of a face of a hole.

4. Portable data player and/or recorder according to claim 1, wherein the door and casing are fitted one with a tongue and the other with a recess in a third shoulder whose dimensions are such that the tongue can enter the recess, the tongue being in abutment against the third shoulder in at least a part of the range of open positions, said tongue being in a position in which it penetrates in said recess of the third shoulder in one of the open positions.

5. Portable data player and/or recorder according to claim 1, wherein the third shoulder is in the form of a face of a hole in the casing, the tongue being an extension that springs outwardly from said face and wherein the recess is located in a third rib that spring outwardly toward the inside of the casing from a main face of the door.

6. Portable data player and/or recorder according to claim 5 wherein the third and second shoulder of the door are in the form of one and the same rib.

* * * * *